US011218850B2

(12) United States Patent
Liu et al.

(10) Patent No.: US 11,218,850 B2
(45) Date of Patent: Jan. 4, 2022

(54) ADAPTIVE EARLY WARNING METHOD BASED ON VEHICLE-TO-EVERYTHING AND APPARATUS THEREOF

(71) Applicant: Huizhou Desay SV Automotive Co., Ltd., Guangdong (CN)

(72) Inventors: Xiaoyang Liu, Guangdong (CN); Yijian Cao, Guangdong (CN); Licong Yan, Guangdong (CN); Qiao Tang, Guangdong (CN)

( * ) Notice: Subject to any disclaimer, the term of this patent is extended or adjusted under 35 U.S.C. 154(b) by 185 days.

(21) Appl. No.: 16/614,382

(22) PCT Filed: Oct. 31, 2017

(86) PCT No.: PCT/CN2017/108608
§ 371 (c)(1),
(2) Date: Nov. 18, 2019

(87) PCT Pub. No.: WO2019/084775
PCT Pub. Date: May 9, 2019

(65) Prior Publication Data
US 2020/0186979 A1 Jun. 11, 2020

(30) Foreign Application Priority Data
Oct. 30, 2017 (CN) .......................... 201711036388.0

(51) Int. Cl.
*H04W 4/40* (2018.01)
*G08G 1/16* (2006.01)
*H04W 4/02* (2018.01)
*H04W 28/02* (2009.01)

(52) U.S. Cl.
CPC .............. *H04W 4/40* (2018.02); *G08G 1/163* (2013.01); *G08G 1/166* (2013.01); *H04W 4/023* (2013.01); *H04W 28/021* (2013.01)

(58) Field of Classification Search
None
See application file for complete search history.

(56) References Cited

U.S. PATENT DOCUMENTS

| | | | |
|---|---|---|---|
| 2017/0008454 A1* | 1/2017 | Christensen | B60Q 9/008 |
| 2018/0093666 A1* | 4/2018 | Kim | B60W 30/16 |
| 2018/0247138 A1* | 8/2018 | Kang | G06K 9/6218 |
| 2018/0268692 A1* | 9/2018 | Takada | G08G 1/137 |
| 2019/0274017 A1* | 9/2019 | Wang | H04W 4/06 |
| 2020/0234580 A1* | 7/2020 | Takada | G06K 9/00805 |

* cited by examiner

*Primary Examiner* — Rebecca E Song
(74) *Attorney, Agent, or Firm* — Prakash Nama; Global IP Services, PLLC

(57) ABSTRACT

An adaptive early warning method based on Vehicle-To-Everything (V2X) and a system thereof, wherein through a mobile communication and a short-range wireless communication technology, connection between a vehicle and a target is achieved, the adaptive early warning method for vehicles comprises steps of: establishing a first monitoring list, determining whether there is a key target among the connectible surrounding targets that reaches a collision early warning threshold, and if any, then establishing a second monitoring list to exclusively receive and monitor the vehicle location and the speed information of the key target; calculating an estimated collision time and a communication delay value; determining a warning level according to the communication delay value and the estimated collision time, and providing an early warning.

7 Claims, 5 Drawing Sheets

| estimated collision time / Threshold of ratio | 3s~4s | 4s~5s | 5s~6s |
|---|---|---|---|
| [30,+∞) | early warning of level 3 | early warning of level 2 | early warning of level 1 |
| [15,30) | early warning of level 4 | early warning of level 3 | early warning of level 2 |
| [0,15) | early warning of level 4 | early warning of level 3 | early warning of level 3 |

FIG.3

ADAPTIVE EARLY WARNING METHOD BASED ON VEHICLE-TO-EVERYTHING AND APPARATUS THEREOF

BACKGROUND OF THE INVENTION

The present invention relates to an intelligent early warning system for car, in particular, to an adaptive early warning method based on Vehicle-To-Everything (V2X) and an apparatus thereof.

Vehicle-to-Everything (V2X) technology is the foundation and key technology for intelligent cars, autonomous driving and intelligent transportation systems in the future. It enables communicate for vehicles to Internet (V2N), vehicles to vehicles (V2V), vehicles to infrastructure (V2I), and vehicles to pedestrians (V2P). At present, there are preliminary implementations in some parts of Europe and the United States. Vehicles obtain a series of traffic information such as cloud services, real-time road conditions, road information, and pedestrian information through mobile networks or short-range network communications, thereby improving driving safety, reducing congestion, improving traffic efficiency, and providing onboard entertainment information. Among them, an anti-collision safety system is an important part of autonomous driving and intelligent transportation. Forward collision early warning and intersection collision warning are the two most common application scenarios in anti-collision safety systems.

At present, for the collision in scenarios such as the collision judgment criteria for the forward collision early warning and the intersection collision warning, most of the judgment criteria for early warning are based on the safety distance threshold. Since a message is sent by wireless communication during rapid vehicle travel, the frequency of message interaction is an extremely important setting parameter wherein a message frequency standard for WAVE/DSRC is 100 ms/time. The current solution has the following problems:

(1) An abnormal phenomenon may occur in the vehicle while driving, such as breaking down and stopping after the collision, so that the frequency of the message is too low to perform normal early warning, resulting in traffic accidents;

(2) During the high-speed driving of the vehicle, the channel communication environment is poor, resulting in loss of the data packet.

(3) In a multi-device connection, frequently transmitting and receiving data may cause channel congestion.

BRIEF SUMMARY OF THE INVENTION

In order to solve the problems of the prior art, the present invention provides an adaptive early warning method based on Vehicle-To-Everything (V2X) and an apparatus thereof.

An adaptive early warning method based on Vehicle-To-Everything (V2X) achieving connection between a vehicle and a target through mobile communication technology, comprising steps of:

S10, establishing a first monitoring list, establishing connections with surrounding connectable targets, and receiving information and determining whether there is a key target among surrounding connectable targets that reaches a collision early warning threshold, and if any, then entering into step S20;

S20, establishing at least one second monitoring list to exclusively receive and monitor the vehicle location and the speed information of the key target;

S30, evaluating the speed difference and the location of the vehicle and the key target, and calculating an estimated collision time; simultaneously, evaluating a communication delay value of the current network through a channel communication;

S40, determining a warning level according to the communication delay value and the estimated collision time, and providing an early warning.

Further, the step S10 includes sub-steps of:

S11, establishing a first monitoring list according to conditions of the target around the vehicle, and establishing connections one by one with a target having a vehicle distance less than a distance threshold, and obtaining and parsing information to extract the speed value and the relative location of the vehicle in the first list;

S12, calculating a speed difference between the vehicle and the currently connected target, and determining whether the speed difference is greater than a speed difference threshold, and if so, determining the target as the key target for removing from the first monitoring list while performing the step S20.

Further, the determining a key target in the step S12 includes:

A. determining the currently connected target as the key target when the speed difference between the vehicle and the currently connected target is positive, and the connected target is located in front of the vehicle;

B. determining the currently connected target as the key target when the speed difference between the vehicle and the currently connected target is negative, and the connected target is located behind the vehicle.

Further, the step S20 includes sub-steps of:

S21, establishing a second monitoring list, recording and connecting the key target removed in the step S10;

S22, performing one-to-one monitoring on the key target, acquiring the speed information and the location information of the key target in real time using a high-frequency update rate.

Further, the step S30 includes sub-steps of:

S301, acquiring the speed of the key target and the speed of the vehicle itself, and calculating the speed difference;

S302, acquiring the relative location and the distance between the two vehicles;

S303, calculating the estimated collision time according to a ratio of the relative location, the distance, and the speed difference.

Further, the step S303 includes:

A. estimating the collision time as a ratio of the relative distance and the speed difference when the speed difference between the vehicle and the key target is positive, and the key target is located in front of the vehicle;

B. estimating the collision time as the ratio of the relative distance and the absolute value of the speed difference when the speed difference between the vehicle and the key target is negative, and the key target is located behind the vehicle.

Further, the step S30 includes sub-steps of:

S311, broadcasting a UDP message, and recording a transmit timestamp;

S312, listening and receiving a feedback message to acquire a timestamp of the received message;

S313, calculating a communication delay value.

Further, the step S40 includes sub-steps of:

S41, calculating a ratio threshold, wherein the ratio threshold is a ratio of the estimated collision time and the communication delay value, and ranking a plurality of ratio levels according to the ratio threshold, wherein the higher the level, the lower the ratio threshold;

S42, ranking a plurality of time levels according to the estimated collision time, wherein the higher the time level, the shorter the estimated collision time;

S43, developing an early warning level according to the ratio level and the time level;

wherein in the same time level, the lower the ratio threshold, the higher the early warning level, and in the same ratio level, the higher the time level, the higher the early warning level.

Preferably, the target and/or key target is at least one of a vehicle, an obstacle, and a wearable device worn on a pedestrian.

In addition, the present invention further provides an adaptive early warning apparatus based on Vehicle-To-Everything (V2X) applying the above adaptive early warning method based on the Vehicle-To-Everything (V2X).

The adaptive early warning method based on Vehicle-To-Everything (V2X) and a system thereof of the present invention has the following beneficial effects:

1. In the present invention, through the complementary combination of channel delay and speed difference greatly, the security performance of the early warning method is greatly improved.

2. Establishing both one-to-many communication and one-to-one communication according to different situations ensures the effective use of system resources and reduces system loads.

3. At the same time, monitoring the conditions of the vehicles around the vehicle may not only realize the early warning of the active collision but also realize the early warning of the passive collision.

BRIEF DESCRIPTION OF THE DRAWINGS

FIG. 3 is a view showing the division for the early warning level in Embodiment 2 of the present invention.

DETAILED DESCRIPTION OF THE INVENTION

The preferred embodiments of the present invention are described in detail below with reference to the accompanying drawings, in which the advantages and features of the invention are more readily understood by those skilled in the art, so that the scope of protection of the present invention is more clearly defined.

Embodiment 1

Figure 1:
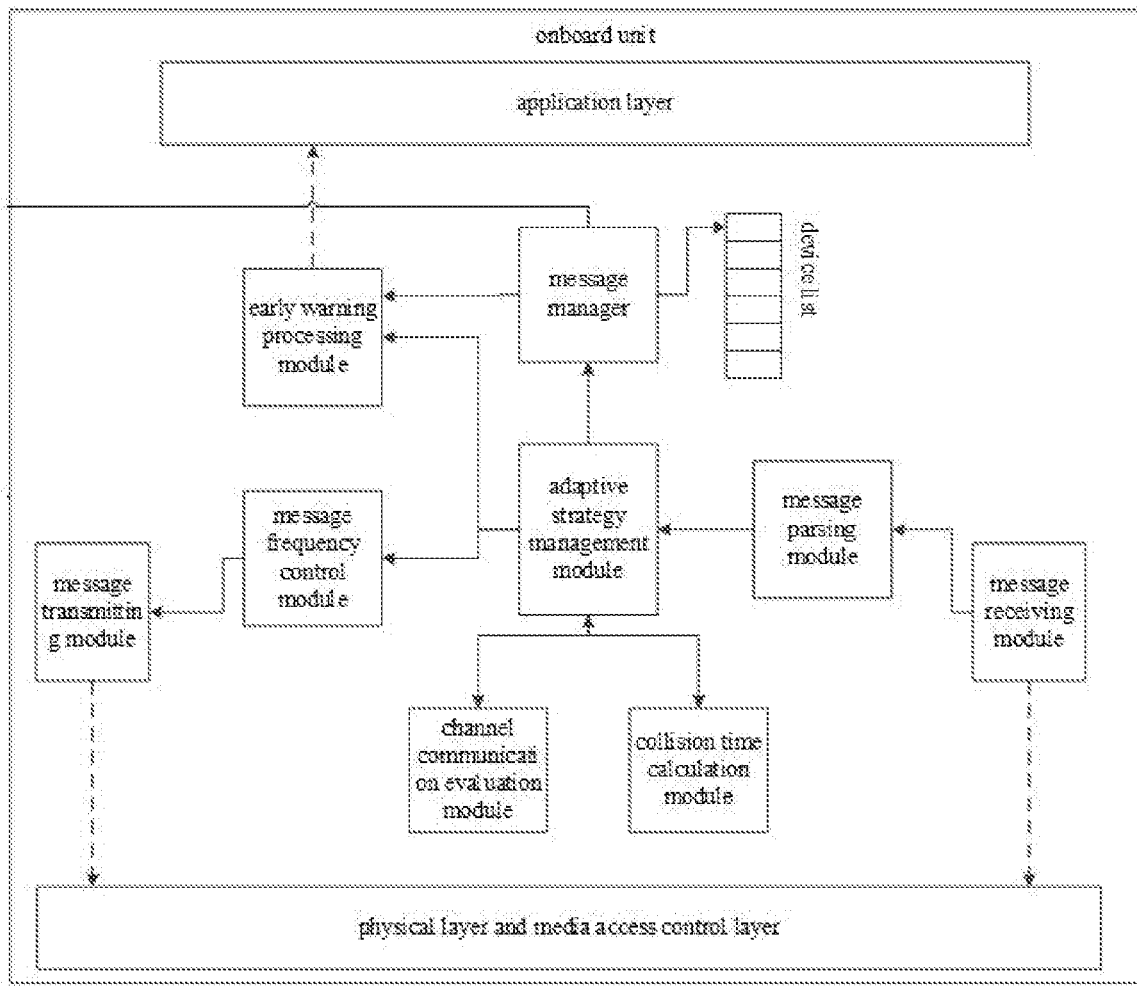
FIG. 1 is a structural diagram of an adaptive early warning apparatus based on Vehicle-To-Everything (V2X) in Embodiment 1 of the present invention.

The present embodiment provides an adaptive early warning apparatus based on Vehicle-To-Everything (V2X), as shown in FIG. 1, comprising an adaptive strategy management module, a device manager, a channel communication evaluation module, a collision time calculation module, a message parsing module, a message frequency control module and an early warning processing module.

Among them, the device manager is used for establishing a first monitoring list and a second monitoring list.

The message parsing module is used for parsing a message received by the target.

The collision time calculation module is used for calculating an estimated collision time.

The channel communication evaluation module is used for determining a communication quality, and the communication module includes at least one module of a SDRC module for short-rage wireless communication and a mobile communication module for long-range communication, and completes connections to other targets within a specific range of the vehicle is completed through the two modules to acquire a location information and a speed information of the target through establishing the connection.

The adaptive strategy management module is responsible for acquiring a signal from the message parsing module to control the device manager for distributing the monitoring list, while transmitting an early warning level to the early warning processing module. Further, a transmitting frequency for the control message may also be sent through the message frequency control module according to the safety and urgency level of the condition.

In the working process of the early warning apparatus, the adaptive strategy management module not only acquires a location signal and a speed signal of the target through the communication module, but also detects a connection quality with the currently connected target, and determines an early warning level according to the connection quality and the position and speed signals.

Embodiment 2

Figure 2:
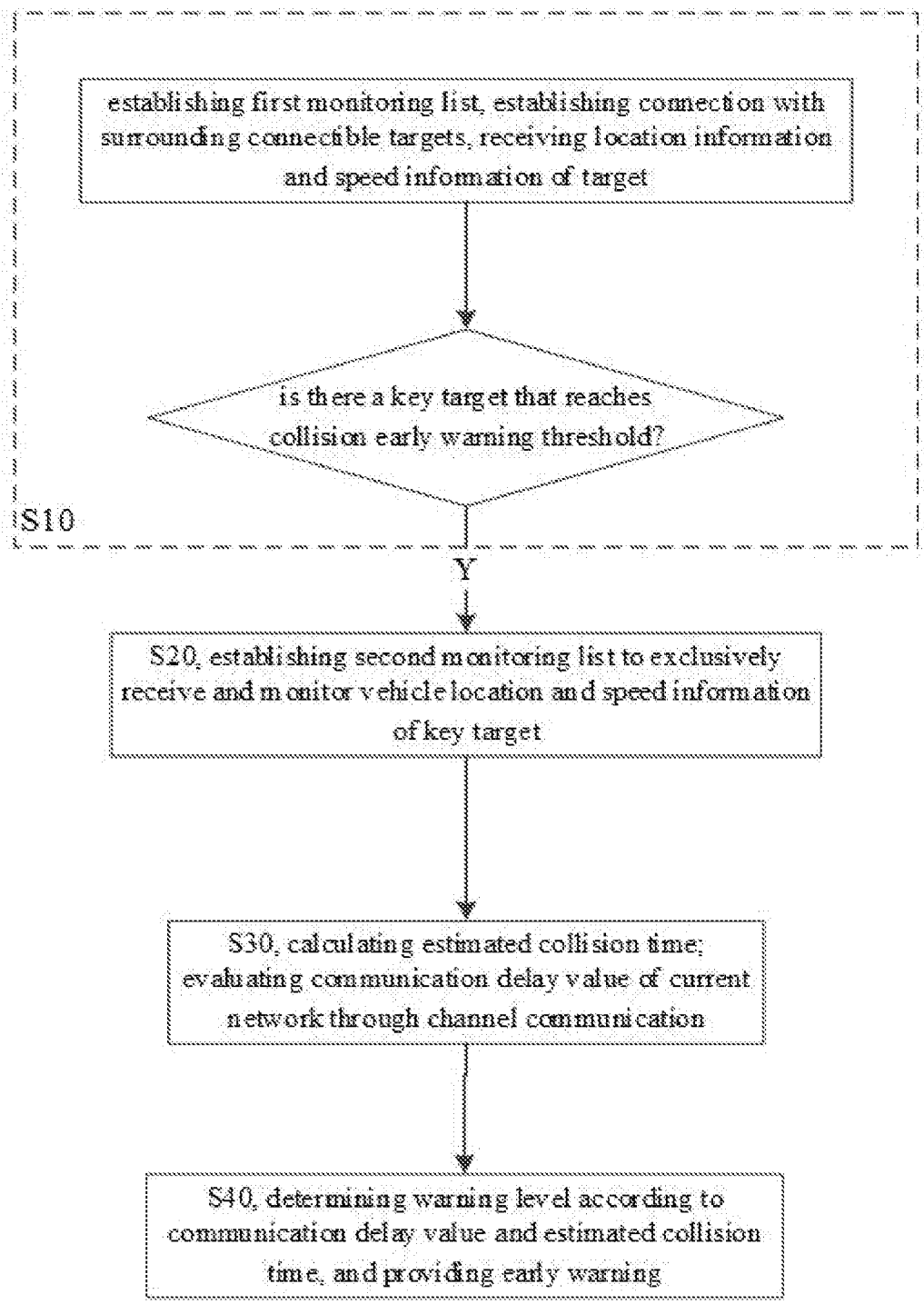
FIG. 2 is a diagram of a method in Embodiment 2 of the present invention.

The present embodiment is based on Embodiment 1, as shown in FIG. 2, an adaptive early warning method based on Vehicle-To-Everything (V2X) using a mobile communication technology and a short-range wireless communication technology, specifically comprising steps of:

S10, establishing a first monitoring list for recording connectable targets. In the present invention, the target refers to an individual on the road, such as other vehicles, roadblocks, etc., which may be communicatively connected to the vehicle, and may also be a wearable device worn on a pedestrian. The vehicle in the present application refers to the vehicle itself.

The content recorded in the list may be, but not only, an ID of the connected target, a speed of the target, a relative position, and the like. By default, a vehicle is usually connected with its surrounding targets one by one in the form of message queues, and the location information and the speed information of the target are acquired after reconnecting, so as to update data in the first monitoring list, wherein the usual connection processing method is the first-in-first-out processing method.

By default, all targets are in a peer-to-peer relationship with respect to the vehicle, and at the same time, determining whether there is a key target reaching a collision early warning threshold for the surrounding targets, and if any, the process proceeds to step S20. In the present embodiment, the collision early warning value may be a coefficient whose positive speed difference is positively correlated. When the speed difference is greater than a certain degree, it is determined that the target reaches the collision early warning value.

S20, since the message is processed by default on a target-by-target basis, and processing each message takes a certain amount of time, this processing method may be adopted in an application scenario where real-time requirements are not high, so that the burden on the terminal processor will be small, but for the scenario of an accident that is about to collide, it is necessary to remind the driver in advance to avoid the accident. It is predicted that the vehicle's motion trajectory may change by the change of the speed difference between the vehicle and the target; since in the collision early warning scenario, the accident early warning is a function with strong real-time demand, and one-to-many communication strategy may not meet the real-time requirements for the scenario, the communication strategy has to be adjusted. So, the present invention adopts a one-to-one communication strategy, i.e., establishing a second monitoring list for only recording one target to perform real-time response and tracking for the massage of the device.

S30, in this step, two parameters are measured, wherein the first parameter is an estimated collision time T0, a time required for the vehicle and the key target calculated according to the current conditions as measured from the current time, and the longer the time, the lower the risk of collision reflected is. The smaller the value, the more dangerous the condition is, so the level of early warning should be increased, and if necessary, the body control system should perform emergency braking. The second parameter is a communication delay value T1, a time for the vehicle and target to complete transmit and receive cycle, wherein the longer the time, the more unstable the network connection reflected is. The message transmission mode for UDP used by broadcasting messages has a certain probability of packet loss; at the same time, the transmission delay increases, the time required to transmit and receive messages at the same distance increases, and the number of interactive messages becomes less, which has a certain impact on the early warning.

Among them, the communication delay value T1 is calculated as follows:

S311, the mobile network preferably using 4G network, broadcasting a UDP message, and recording a transmit timestamp Ts;

S312, listening and receiving a feedback message to acquire a timestamp of the received message Tr, S313, calculating a communication delay value T1 as follows:

$T1=Tr-Ts.$

S40, determining a warning level according to the communication delay value and the estimated collision time, and providing an early warning. Specifically, the division for the early warning level may be performed as follows:

S41, calculating a ratio threshold N, wherein the ratio threshold is a ratio of the estimated collision time and the communication delay value, and ranking a plurality of ratio levels according to the ratio threshold, wherein the higher the level, the lower the ratio threshold. The formula for the above is as follows:

$$N = \frac{T0}{T1}.$$

S42, ranking a plurality of time levels according to the estimated collision time, wherein the higher the time level, the shorter the estimated collision time. In the present embodiment, according to the calculation for the minimum safe distance of the vehicle braking dynamics, the driver response time during vehicle braking is 0.8~2 s, the coordination time for car braking is 0.5 s, and the growth time for car deceleration is 0.2 s, so the minimum value of the estimated collision time T0 should be 3 s. The estimated collision time T0 is divided into four time levels, which correspondingly are 0 s~3 s, 3 s~4 s, 4 s~5 s, and 5 s~6 s, wherein 0 s~3 s represents the highest level, reflecting the most urgent condition.

S43, developing an early warning level according to the ratio level and the time level. In this step, assuming that the current message transmission frequency for the vehicle is 10 HZ, that is, 100 ms/time to transmit a message, and the transmission delay is ideally 0, then in the minimum value 3 s of the estimated collision time T0, the current vehicle and the connected vehicle have 30 information interactions, that is, the ratio threshold is N=30. If the transmission delay is 100 ms, in 3 s, the number of information interactions for the current vehicle and the connected vehicle is decreased to 15; if the network transmission delay increases or even the message is missing and may not be ready for broadcasting due to the loss of the packet, the ratio threshold N may continue to decrease, then the early warning level may be adaptively adjusted. Specifically, the ratio threshold is divided into three levels, which progressively increases from being safe to being urgent: 30 or more; 15 to 30; 15 or less.

Among them, the adjustment rule is as follows: in the same time level, the lower the ratio threshold, the higher the early warning level, and in the same ratio level, the higher the time level, the higher the early warning level. Specifically, with reference to FIG. 3, finally, the system is set to four early warning levels according to the ratio level and the time level, wherein the early warning of level 1 is the lowest; the early warning of level 4 is the highest, indicating the most urgent, then the system may provide a response according the early warning level.

Embodiment 3

Figure 4:
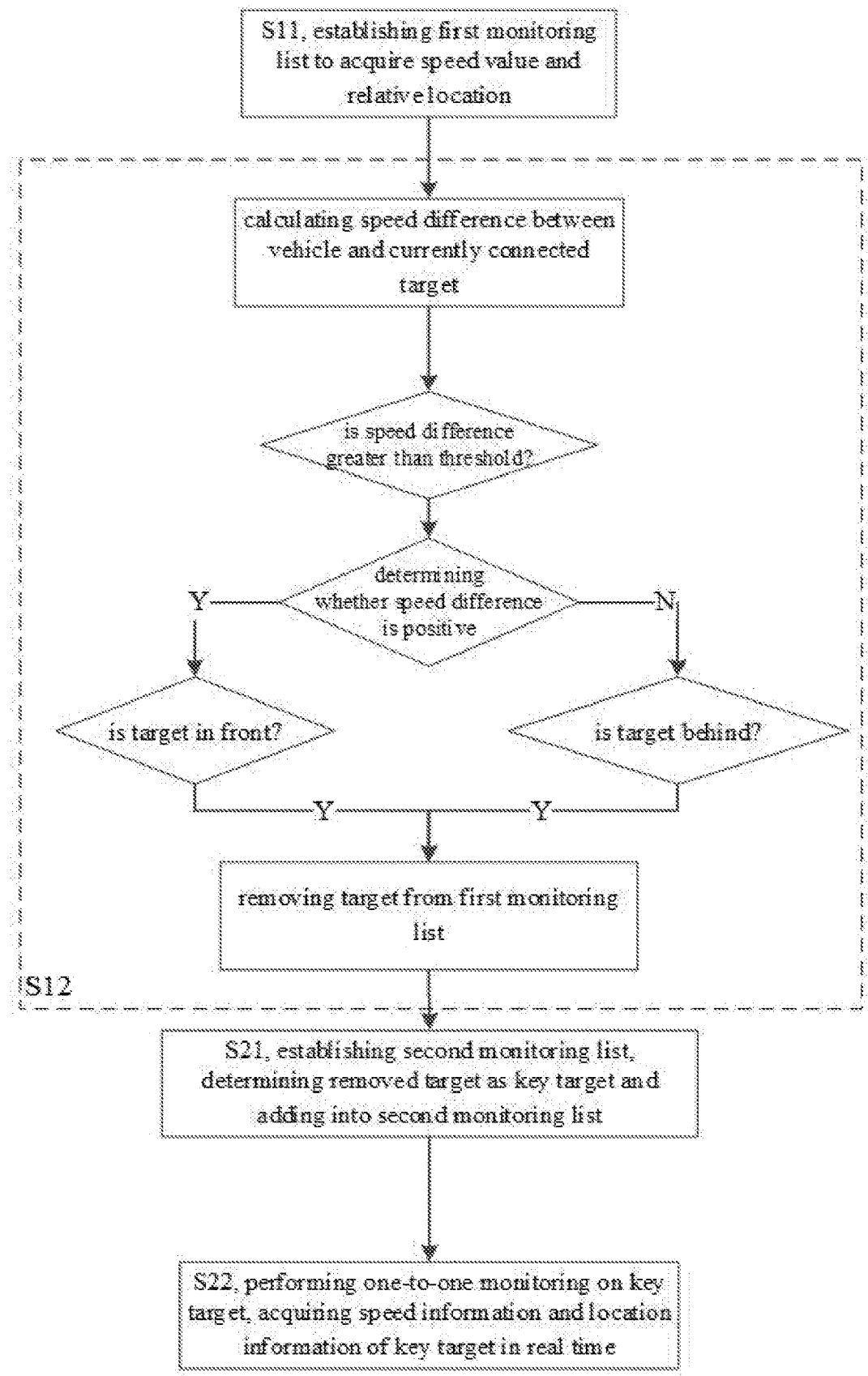
FIG. 4 is a view showing the classification for the monitoring list in Embodiment 3 of the present invention.

As an optimization of Embodiment 2, the present embodiment is different from Embodiment 1 is that as shown in FIG. 4, the present embodiment also classifies the location of the target in the process of connecting the target, which is divided into a target in front of the vehicle and a target behind the vehicle.

S11, establishing a first monitoring list according to conditions of the target around the vehicle, and establishing a connection one by one with a target having a vehicle distance less than a distance threshold, and obtain and parsing information to extract a speed value and a relative location of the vehicle in the first list.

S12, calculating a speed difference between the vehicle and the currently connected target, and determining whether the speed difference is greater than a speed difference threshold according the speed difference, wherein in the present embodiment, the speed difference threshold is at least 10 km/h. If any, determining the currently connected target as the key target for removing from the first monitoring list while performing the step S20.

Among them, after the relative location information of the target is added, the determining a key target includes:

A. determining the currently connected target as the key target when the speed difference between the vehicle and the currently connected target is positive, and the connected target is located in front of the vehicle, then the active collision condition, such as rear-end collision from the vehicle to the target, should be early warned.

B. determining the currently connected target as the key target when the speed difference between the vehicle and the currently connected target is negative, and the connected target is located behind the vehicle, then the passive collision condition, such as rear-end collision from the target to the vehicle, should be early warned.

The step S20 includes sub-steps of:

S21, establishing a second monitoring list, recording and connecting the key target removed in the step S10.

S22, performing one-to-one monitoring on the key target, acquiring the speed information and the location information of the key target in real time using a high-frequency update rate.

Embodiment 4

Figure 5:
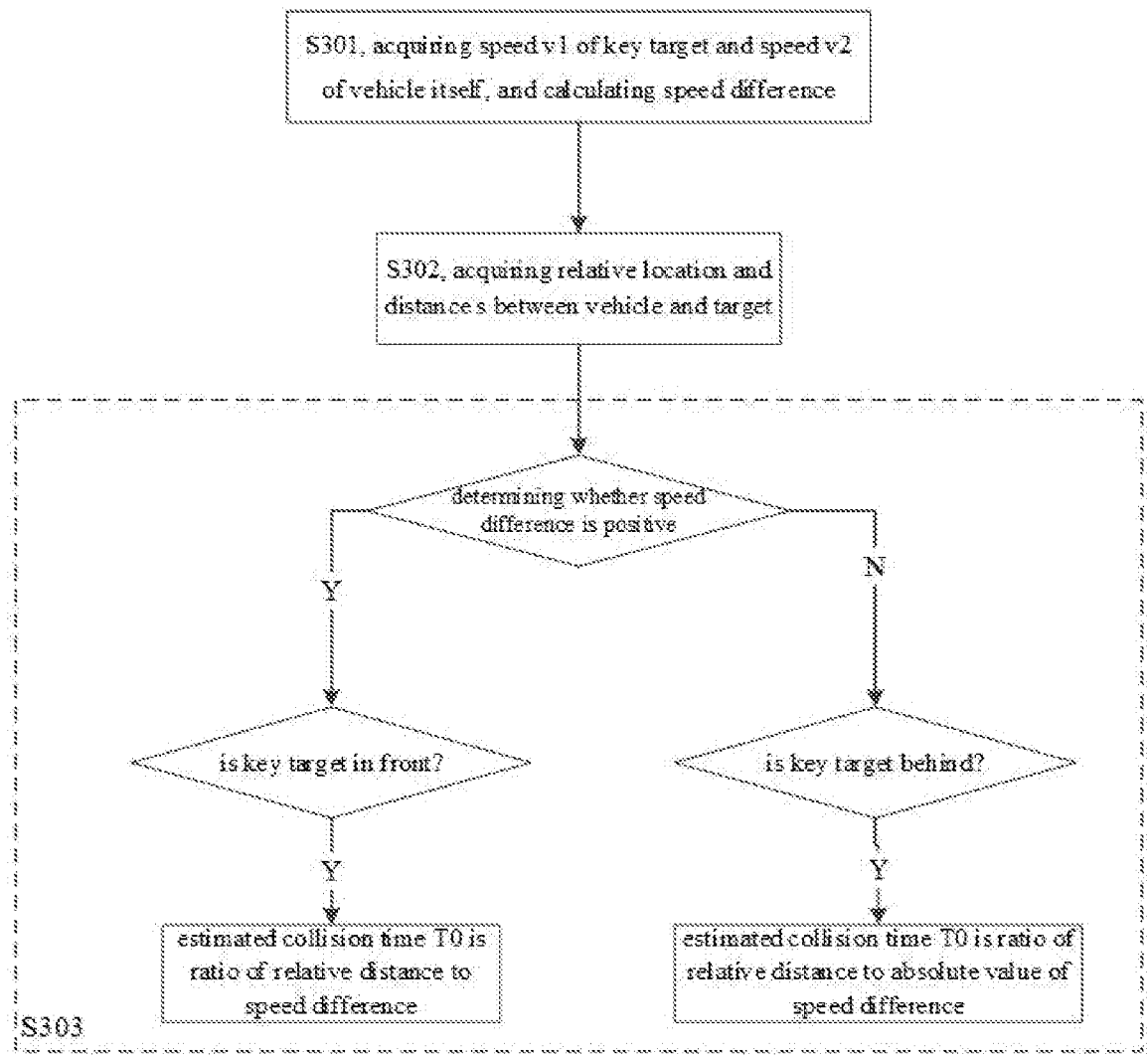
FIG. 5 is a flowchart of a method for estimating collision time in Embodiment 4 of the present invention.

As a supplement to Embodiments 2 and 3, the present embodiment is different from Embodiment 2 or 3 in that: as shown in FIG. 5, in the present embodiment, the estimated collision time is calculated by steps of:

S301, acquiring the speed v1 of the key target and the speed v2 of the vehicle itself, and calculating the speed difference.

S302, acquiring the relative location and the distance s between the vehicle and the target.

S303, calculating the estimated collision time T0 according to a ratio of the relative location, the distance s, and the speed difference.

Specifically, the estimated collision time T0 may be calculated in the following two conditions:

A. estimating the collision time T0 as a ratio of the relative distance and the speed difference when the speed difference v2−v1 between the vehicle and the key target is positive, and the key target is located in front of the vehicle, i.e., $$T0 = \frac{S}{V2 - V1}.$$

B. estimating the collision time T0 as a ratio of the relative distance and an absolute value of the speed difference when the speed difference v2−v1 between the vehicle and the key target is negative, and the key target is located behind the vehicle, i.e., $$T0 = \frac{S}{|V2 - V1|}.$$

The embodiments of the present invention have been described in detail above with reference to the accompanying drawings, but the present invention is not limited to the above embodiments. Various changes may be made within the knowledge of those skilled in the art without departing from the spirit and scope of the present invention.

What is claimed is:

1. An adaptive early warning method based on Vehicle-To-Everything (V2X) achieving connections between a vehicle and a target through mobile communication technology, characterized by comprising steps of:
   a first step: establishing a first monitoring list, establishing connections with connectible surrounding targets, and receiving information and determining whether there is a key target among the connectible surrounding targets that reaches a collision early warning threshold, and if any, then entering a second step;
   the second step: establishing at least one second monitoring list to exclusively receive and monitor the vehicle location and the speed information of the key target;
   a third step: evaluating the speed difference and the location of the vehicle and the key target, and calculating an estimated collision time; simultaneously, evaluating a communication delay value of the current network through a channel communication; and
   a fourth step: determining a warning level according to the communication delay value and the estimated collision time, and providing an early warning;
   the first step includes the following sub-steps of:
   establishing a first monitoring list according to conditions of the target around the vehicle, and
   establishing connections one by one with a target having a vehicle distance less than a distance threshold, and obtaining and parsing information to extract the speed value and the relative location of the vehicle in the first list;
   calculating a speed difference between the vehicle and the currently connected target, and
   determining whether the speed difference is greater than a speed difference threshold, and
   determining the currently connected target as the key target for removing from the first monitoring list while performing the second step if the speed difference is greater than the speed difference threshold and the speed difference between the vehicle and the currently connected target is positive and the currently connected target is located in front of the vehicle, or if the speed difference is greater than the speed difference threshold and the speed difference between the vehicle and the currently connected target is negative and the currently connected target is located behind the vehicle.

2. The adaptive early warning method based on Vehicle-To-Everything (V2X) according to claim 1, characterized in that the second step includes sub-steps of:
   establishing a second monitoring list, recording and connecting the key target removed in the first step; and
   performing one-to-one monitoring on the key target, acquiring the speed information and the location information of the key target in real time using a high-frequency update rate.

3. The adaptive early warning method based on Vehicle-To-Everything (V2X) according to claim 1, characterized in that the third step includes sub-steps of:
   acquiring the speed of the key target and the speed of the vehicle itself, and calculating the speed difference;
   acquiring the relative location and the distance between the two vehicles; and
   calculating the estimated collision time according to a ratio of the relative location, the distance, and the speed difference.

4. The adaptive early warning method based on Vehicle-To-Everything (V2X) according to claim 3, characterized in that the step of calculating the estimated collision time according to the ratio of the relative location, the distance, and the speed difference includes the following steps:
   estimating the collision time as a ratio of the relative distance and the speed difference when the speed difference between the vehicle and the key target is positive, and the key target is located in front of the vehicle; and
   estimating the collision time as the ratio of the relative distance and the absolute value of the speed difference when the speed difference between the vehicle and the key target is negative, and the key target is located behind the vehicle.

5. The adaptive early warning method based on Vehicle-To-Everything (V2X) according to claim 1, characterized in that the third step includes sub-steps of:
broadcasting a User Datagram Protocol (UDP) message, and recording a transmit timestamp;
listening and receiving a feedback message to acquire a timestamp of the received message; and
calculating a communication delay value.

6. The adaptive early warning method based on Vehicle-To-Everything (V2X) according to claim 1, characterized in that the fourth step includes sub-steps of:
calculating a ratio threshold, wherein the ratio threshold is a ratio of the estimated collision time and the communication delay value, and ranking a plurality of ratio levels according to the ratio threshold, wherein the higher the level, the lower the ratio threshold;
ranking a plurality of time levels according to the estimated collision time, wherein the higher the time level, the shorter the estimated collision time; and
developing an early warning level according to the ratio level and the time level;
wherein in the same time level, the lower the ratio threshold, the higher the early warning level, and in the same ratio level, the higher the time level, the higher the early warning level.

7. The adaptive early warning method based on Vehicle-To-Everything (V2X) according to claim 1, characterized in that the target and/or key target is at least one of a vehicle, an obstacle, and a wearable device worn on a pedestrian.

* * * * *